US012558777B2

(12) United States Patent
    Kitagawa

(10) Patent No.: US 12,558,777 B2
(45) Date of Patent: Feb. 24, 2026

(54) FLYING ROBOT

(71) Applicant: NEC Corporation, Tokyo (JP)

(72) Inventor: Takeharu Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 18/181,049

(22) Filed: Mar. 9, 2023

(65) Prior Publication Data

US 2023/0286141 A1     Sep. 14, 2023

(30) Foreign Application Priority Data

Mar. 14, 2022    (JP) ................................ 2022-039077

(51) Int. Cl.
    *B64U 20/70* (2023.01)
    *B25J 9/00* (2006.01)
    *B25J 9/16* (2006.01)
    *B64U 101/60* (2023.01)

(52) U.S. Cl.
    CPC ............. *B25J 9/162* (2013.01); *B25J 9/0009* (2013.01); *B64U 20/70* (2023.01); *B64U 2101/60* (2023.01)

(58) Field of Classification Search
    CPC ........ B64U 10/13; B64U 10/70; B64U 20/50; B64U 20/70; B64U 2101/60; B64U 2101/64; B64U 2101/66; B64U 2101/70; B64U 2101/75; B65G 17/323; B64C 25/32; B64C 37/00; B64C 37/02; B64C 39/026; B62D 57/032; B60F 5/02; B25J 9/009; B25J 9/162

USPC .............................................................. 244/2
See application file for complete search history.

(56) References Cited

U.S. PATENT DOCUMENTS

| | | | | |
|---|---|---|---|---|
| 10,890,921 | B2 * | 1/2021 | Gillett | B64C 37/00 |
| 12,157,587 | B2 * | 12/2024 | Dao | B64C 29/02 |
| 2006/0192047 | A1 * | 8/2006 | Goossen | B64U 50/12 |
| | | | | 244/17.23 |
| 2017/0197719 | A1 * | 7/2017 | Kwon | B64U 10/13 |
| 2019/0069496 | A1 * | 3/2019 | Wofford | A01G 25/09 |
| 2020/0148360 | A1 * | 5/2020 | Zhang | B64D 1/22 |
| 2021/0061464 | A1 * | 3/2021 | Mochida | B64U 10/13 |
| 2023/0182933 | A1 * | 6/2023 | Ogasawara | B64D 27/402 |
| | | | | 244/46 |
| 2023/0339106 | A1 * | 10/2023 | Lu | B25J 9/1625 |
| 2024/0182190 | A1 * | 6/2024 | Reemtsma | B64U 70/92 |
| 2024/0262145 | A1 * | 8/2024 | Kitagawa | B62D 57/032 |
| 2024/0367824 | A1 * | 11/2024 | La | B64U 10/16 |

FOREIGN PATENT DOCUMENTS

| | | | |
|---|---|---|---|
| CN | 203342363 | U * | 12/2013 |
| CN | 113238569 | * | 8/2021 |
| CN | 214241227 | U * | 9/2021 |
| JP | 2019-156045 | A | 9/2019 |
| JP | 2021-533425 | A | 12/2021 |

* cited by examiner

*Primary Examiner* — Joshua E Rodden
(74) *Attorney, Agent, or Firm* — Sughrue Mion, PLLC

(57) ABSTRACT

A flying robot includes a body, an arm disposed on a lateral side of the body, a leg disposed under the body, and a propulsion unit disposed around the body. The arm is able to move at least to above the body, and the propulsion unit is disposed in an area different from an area in which the arm is able to move and to do predetermined work.

7 Claims, 6 Drawing Sheets

FLYING ROBOT

INCORPORATION OF BASIC APPLICATION

The present application claims the priority of Japanese Patent Application No. 2022-039077 filed on Mar. 14, 2022 in Japan, the contents of which are incorporated herein by reference in its entirety.

TECHNICAL FIELD

The present invention relates to a flying robot.

BACKGROUND ART

Unmanned flying objects called drone have been widely used in recent years, and their utilization in various applications are being considered. In particular, flying robots capable of flying to a destination to which a human cannot move and doing predetermined work at the destination are being considered. For example, Japanese Unexamined Patent Application Publication No. 2019-156045 and Japanese Unexamined Patent Application Publication (Translation of PCT Application) No. 2021-533425 describe robots that each include an arm(s), a leg(s), and a rotary wing for flight for allowing the robot to fly and are able to move by flight to a destination and to work using the arm(s) at the destination while walking using the leg(s).

See Japanese Unexamined Patent Application Publication No. 2019-156045 and Japanese Unexamined Patent Application Publication (Translation of PCT Application) No. 2021-533425.

SUMMARY OF INVENTION

However, the above-mentioned flying robots have a propulsion unit(s) disposed thereover. This results in a problem that the arm(s) is prevented from working above the robot, that is, the degree of freedom of work is limited.

Accordingly, an object of the present invention is to solve the above-mentioned problem that the degree of freedom of work done by the arm(s) of the flying robot is limited.

A flying robot according to one aspect of the present invention includes a body, an arm disposed on a lateral side of the body, a leg disposed under the body, and a propulsion unit disposed around the body. The arm is able to move at least to above the body, and the propulsion unit is disposed in an area different from an area in which the arm is able to move and to do predetermined work.

The present invention thus configured is able to improve the degree of freedom of work done by the arm of the flying robot.

DESCRIPTION OF EMBODIMENTS

First Example Embodiment

Figure 1:
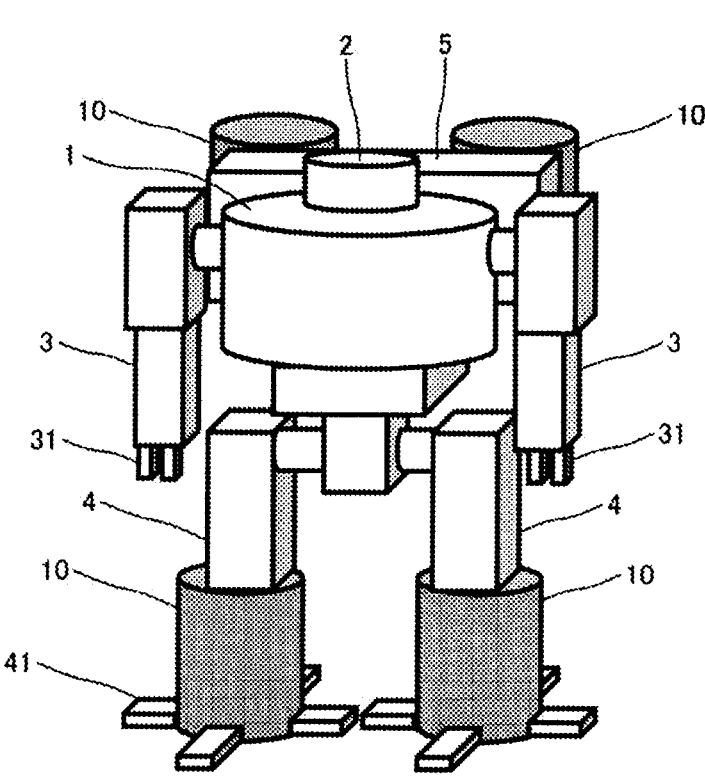
FIG. 1 is a drawing showing a configuration of a flying robot according to a first example embodiment of the present invention.
Figure 2:
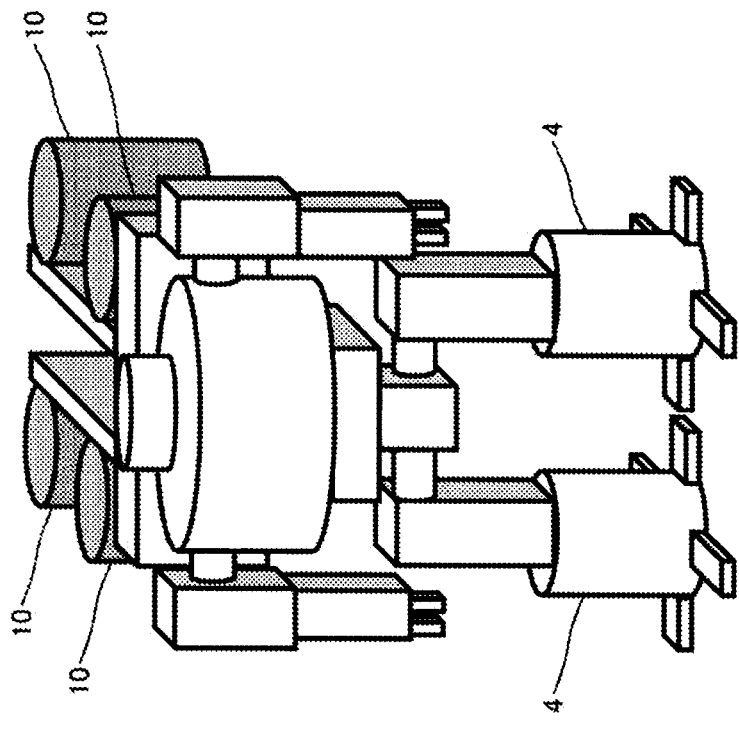
FIG. 2 is a drawing showing modifications of the configuration of the flying robot disclosed in FIG. 1.
Figure 2:
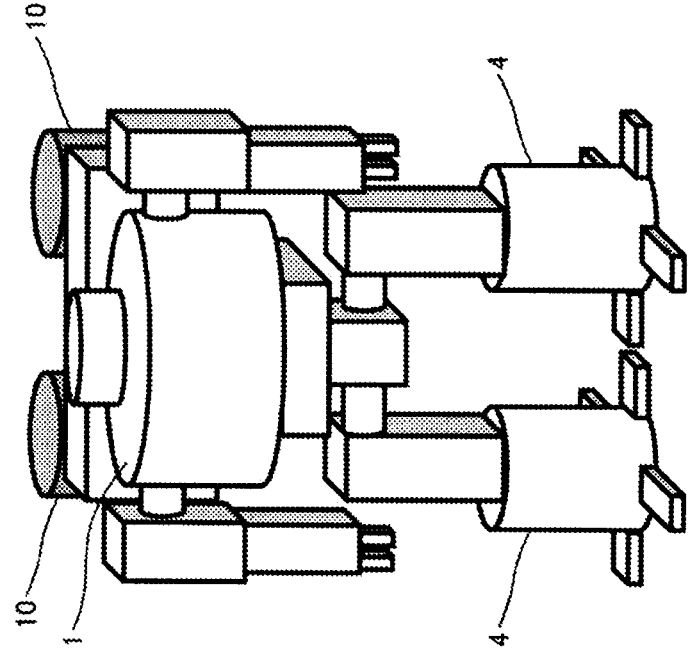
Figure 3:
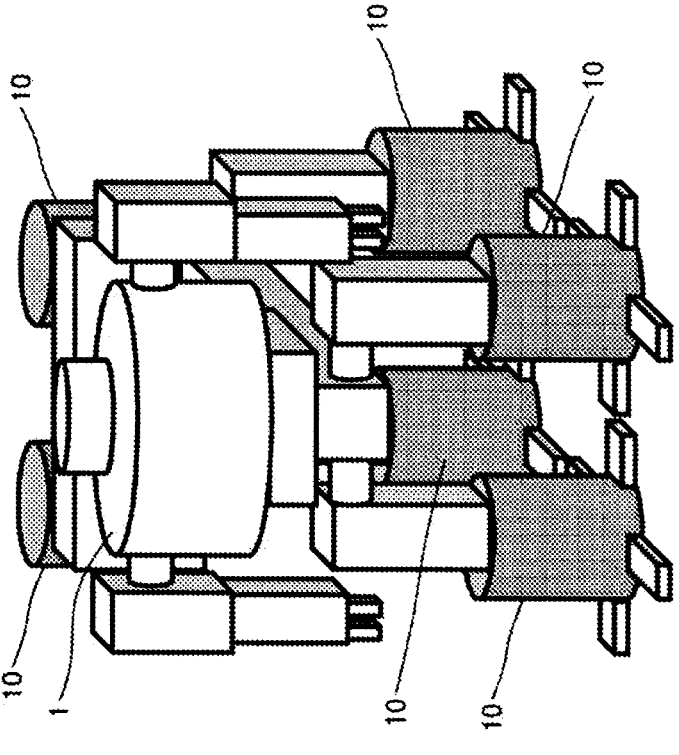
FIG. 3 is a drawing showing modifications of the configuration of the flying robot disclosed in FIG. 1.
Figure 3:
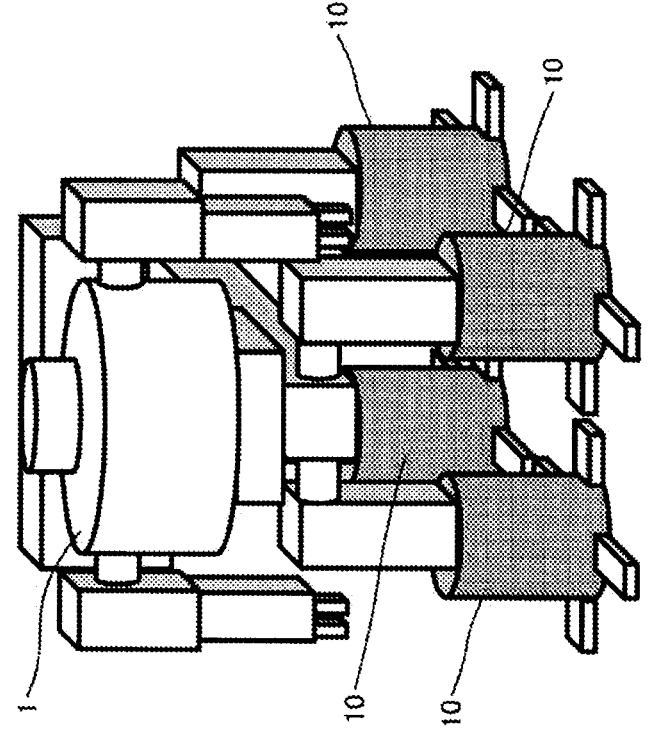

A first example embodiment of the present invention will be described with reference to FIGS. 1 to 3. FIGS. 1 to 3 are drawings schematically showing a configuration of a flying robot according to the present example embodiment.

Configuration

A flying robot according to the present invention is configured to be able to move by flight and walking. Thus, for example, the flying robot is used such that it flies to a destination to which a human cannot move and does predetermined work at the destination. As a more specific example, the flying robot can be used such that it removes debris in a disaster area, or does construction work or picks up objects in outer space.

As shown in FIG. 1, the flying robot includes a body 1, two arms 3 disposed on both the lateral sides of the body 1, and legs 4 disposed under the body 1. As shown in FIG. 1, the flying robot may include a head 2. The legs 4 are configured to be able to walk and consist of, for example, two or four legs. As an example, the flying robot as shown in FIG. 1 includes two legs 4. Note that the front side of FIG. 1 is defined as the front side of the flying robot and the opposite side is defined as the rear side thereof.

The flying robot also includes a container 5 disposed on the rear surface of the body 1. For example, the container 5 has an opening on the upper surface thereof so that objects can be contained therein. For example, the container 5 is used such that construction tools are previously contained therein or objects grasped by the arms 3 are contained therein.

The flying robot also includes two propulsion units 10 disposed behind the container 5 on the rear surface of the body 1. In FIG. 1, the propulsion units 10 are shown in gray (shaded). For example, each propulsion unit 10 is in a cylindrical shape having a predetermined height, contains a rotary wing, and is configured to produce a thrust force in the height direction. Each propulsion unit 10 is also provided with a motor for driving its rotary wing. For example, the motor is disposed in the propulsion unit 10 itself or the container 5. As seen above, the rear-side propulsion units 10 are disposed behind the body 1 with the container 5 therebetween.

The two arms 3 each have a grasping mechanism 31 on the tip thereof and are able to grasp predetermined objects. The two arms 3 are configured to be able to move the grasping mechanisms 31 on the tips to the front of and above the body 1. Specifically, the arms 3 are configured to be able to move the grasping mechanisms 31 to above and inside the container 5. The front and lateral areas as well as the upper area including the disposition area of the container 5 is an area in which the two arms 3 are able to work. Thus, the flying robot is able to cause the arms 3 to do work such as grasping objects contained in the container 5 or picking up objects in front and putting them into the container 5. The two arms 3 each include an actuator capable of realizing the above movements.

In other words, the propulsion units 10 disposed area behind the container 5 can be said to be an area different from the areas in which the two arms 3 are able to work. By disposing the propulsion units 10 in such an area, interference with the propulsion units 10 by the arms 3 can be prevented. Note that the arms 3 may be able to move also to behind the body 1. In this case, the arms 3 are configured not to interfere with the propulsion units 10. For example, when the propulsion units 10 are in operation, the arms 3 are controlled so that they do not move rearward or do not work in the rear.

The two legs 4 are configured to be able to move back and forth, left and right and allows the flight robot to walk bipedally. For this reason, the two legs 4 each include an actuator capable of realizing bipedal walking. Propulsion units 10 may be disposed under the two legs 4, that is, may be disposed on lower portions of the two legs 4. Note that propulsion units 10 may be disposed on side portions of the two legs 4 or propulsion units 10 themselves may serve as the legs 4. Even if the propulsion units 10 are disposed on the legs 4, the flying robot is able to move back and forth, left and right. In FIG. 1, the propulsion units 10 are shown in gray (shaded). As with the propulsion units 10 behind the body 1, the propulsion units 10 disposed on the legs 4 are also in a cylindrical shape having a predetermined height, each include a rotary wing, and are configured to produce a thrust force in the height direction. For this reason, the grounded bottoms of the propulsion units 10 disposed on the legs 4 are open. Motors for driving the rotary wings of the propulsion units 10 disposed on the legs 4 are disposed in, for example, the propulsion units 10 themselves.

Multiple protrusions 41 protruding outward are disposed around the bottoms of the legs 4 and, more specifically, around the bottoms of the propulsion units 10 disposed integrally on the lower portions of the legs 4. The protrusions 41 are in, for example, a plate shape, and ends thereof are joined to the peripheries of the legs 4 (propulsion units 10). The protrusions 41 are configured such that the protruding end sides thereof can be displaced in the up-down direction using the junctions as supports. Specifically, the protrusions 41 are rotatably joined to the legs 4 and provided with, at the junctions, actuators for rotationally driving the protrusions 41 themselves. Thus, the grounded area of the legs 4 is increased. Also, since the protrusions 41 are rotationally driven in accordance with the shape of the ground surface, the legs 4 keep their balance when grounded, resulting in stabilization of walking.

The body 1 contains a battery. The battery supplies electric power serving as the power source of the propulsion units 10 to the propulsion units 10. The battery also supplies electric power to the actuators for driving the arms 3, legs 4, and the like. Since the battery is contained in the body 1 having a large volume, the shape of the flying robot can be efficiently used.

The flying robot also includes components for controlling the mobility of the flying robot, such as a communication unit, a controller, and various types of sensors. For example, the controller controls the propulsion operation of the propulsion units 10 or the mobility of the arms 3 and legs 4 in accordance with a remote operation instruction. Note that the components for controlling the mobility of the flying robot may be contained in the head 2 disposed on the body 1.

As described above, in the flying robot according to the present example embodiment, the propulsion units 10 are disposed in the area behind the body 1, which is an area different from the area in which the arms 3 are able to work. Thus, a flight using a thrust force produced by the propulsion units 10 can be performed stably without being interfered with. By disposing the propulsion units 10 also on the legs 4, a flight can be performed more stably.

While the case in which the container 5 is disposed on the rear surface of the body 1 and the propulsion units 10 are disposed behind the container 5 has been described above, the propulsion units 10 may be disposed directly on the rear surface of the body 1 rather than disposing the container 5 there. In this case, the container 5 may be disposed on the periphery of the body 1 except for the rear surface, for example, on the front surface, or the container 5 need not be disposed. While the case in which the grasping mechanisms 31 are formed on the tips of the arms 3, the grasping mechanisms 31 need not be disposed.

While the case in which the propulsion units 10 are disposed behind the body 1 has been described, the propulsion units 10 may be disposed around the body 1 except for behind the body 1. For example, if an area on a lateral side or front side of the body 1 around the body 1 is not the area in which the arms 3 are able to work, the propulsion units 10 may be disposed the area on the lateral side or front side.

While the propulsion units 10 have been described as units that produce a thrust force by rotating the rotary wings, they may be units that produce a thrust force using any structure or on any principles. For example, the propulsion units 10 may be jet engines or nuclear fusion engines. In this case, a fuel serving as the power source of the jet engines or a nuclear fusion reactor serving as the power source of the nuclear fusion engines is contained in the body 1.

Modifications of the configuration of the flying robot described above will be described below with reference to FIGS. 2 and 3. As shown in the left drawing of FIG. 2, in a flying robot, propulsion units 10 may be disposed only behind a body 1 without disposing propulsion units 10 on legs 4. Also, as shown in the right drawing of FIG. 2, in a flying robot, four propulsion units 10 may be disposed behind the body 1. The number of propulsion units 10 may be any number.

Also, as shown in the left drawing of FIG. 3, in a flying robot, four legs 4 may be disposed without disposing propulsion units 10 behind the body 1, and propulsion units 10 may be disposed on the legs 4. Also, as shown in the right drawing of FIG. 3, a flying robot may include four legs 4 provided with propulsion units 10, as well as two propulsion units 10 disposed behind a body 1. The number of propulsion units 10 may be any number. Note that a flying robot may include any number of legs 4 provided with propulsion units 10.

Second Example Embodiment

Figure 4:
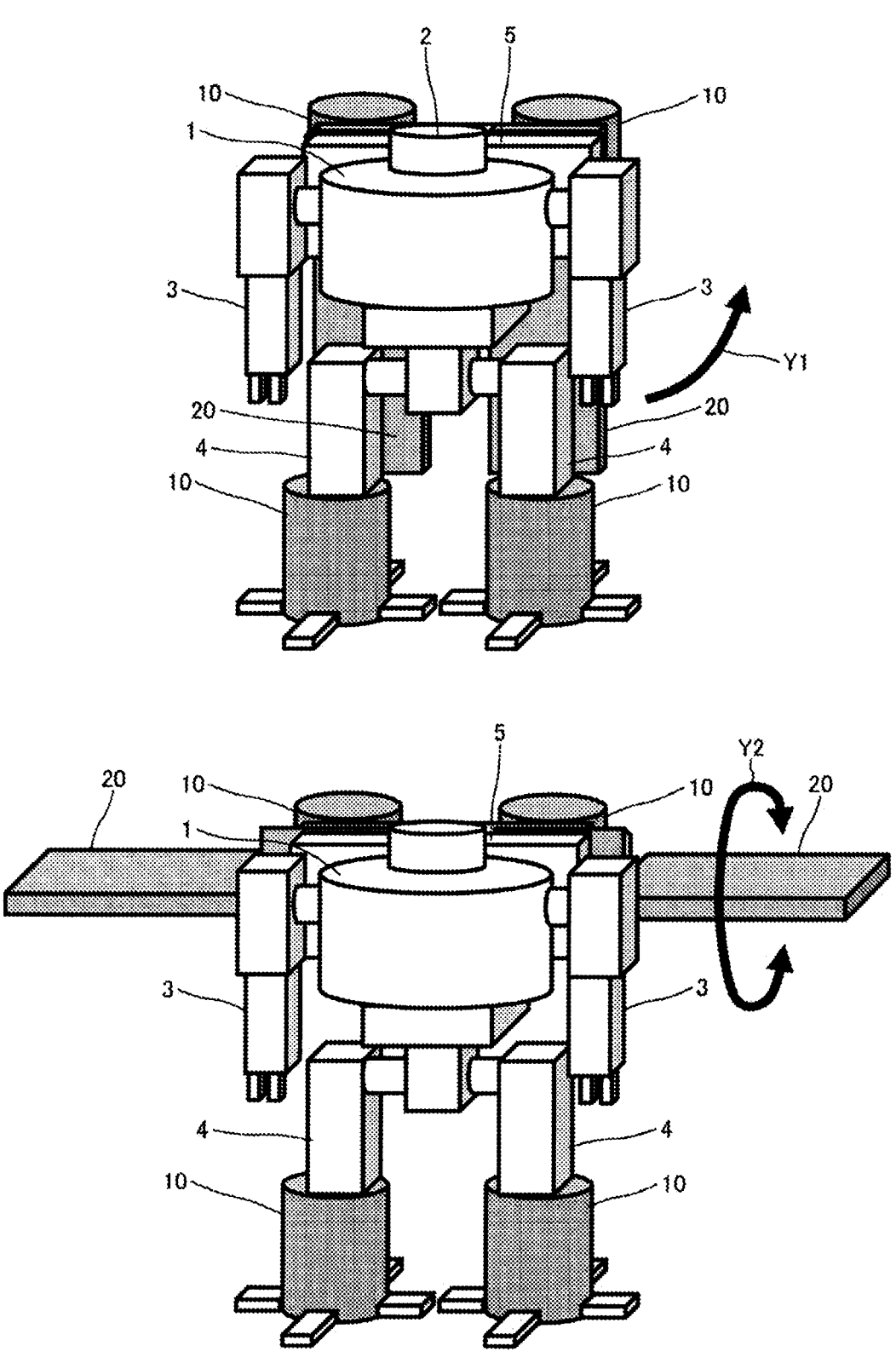
FIG. 4 is a drawing showing a configuration of a flying robot according to a second example embodiment of the present invention.
Figure 5:
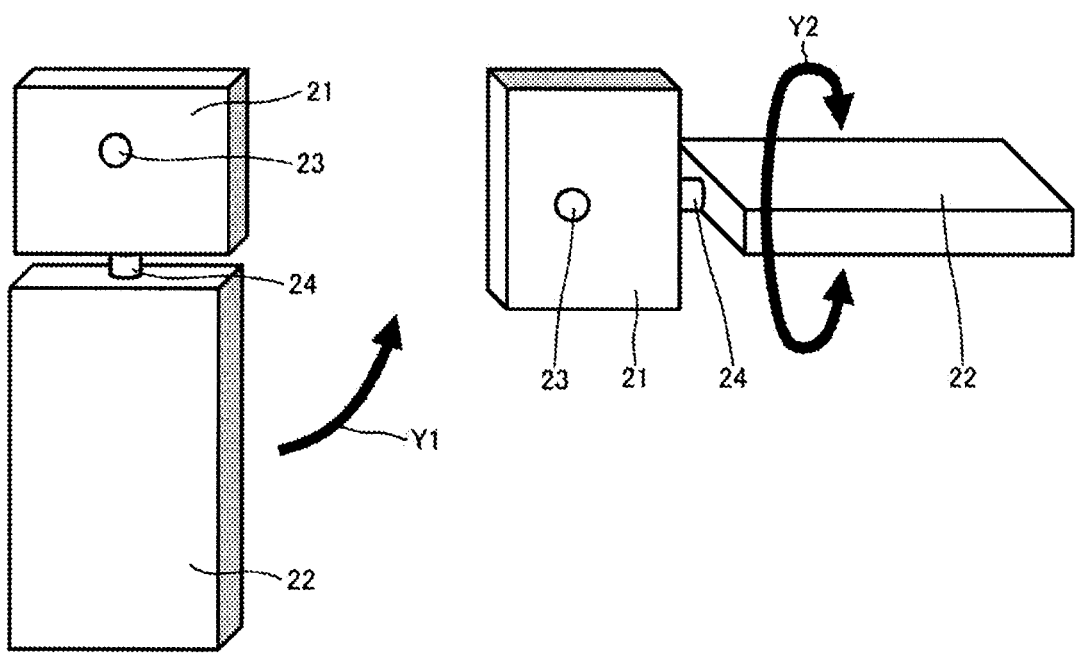
FIG. 5 is a drawing showing a part of the configuration of the flying robot disclosed in FIG. 4.

Next, a second example embodiment of the present invention will be described with reference to FIGS. 4 and 5. FIGS. 4 and 5 are drawings schematically showing a configuration of a flying robot according to the present example embodiment.

As shown in FIG. 4, the flying robot according to the present example embodiment includes the components described in the first example embodiment, as well as wings 20 shaded in FIG. 4. The wings 20 consist of two approximately plate-shaped members and have a predetermined length. In an example in FIG. 4, the wings 20 consist of rectangular plate-shaped members having a predetermined thickness. The wings 20 are disposed behind the body 1 and, more specifically, between a container 5 and propulsion units 10. Note that the wings 20 may be formed into any shape. For example, the wings 20 may be formed so as to have a wing-shaped cross section. The wings 20 may also be formed so as to have an external shape whose width becomes narrower in positions more distant from the body 1 along the length direction.

The upper drawing of FIG. 4 shows a state in which the wings 20 are closed, and the lower drawing of FIG. 4 shows a state in which the wings 20 are spread. In the closed state, the wings 20 extend along the direction of an airflow generated by the propulsion units 10 so as not to interfere with a rise caused by the propulsion units 10, and the upper ends thereof, which are ends in the length direction, are rotatably supported behind the body 1. Thus, by rotating the other ends in the length direction as rotating ends using the upper ends as supports as shown by an arrow Y1 in the upper drawing of FIG. 4, the wings 20 are spread as shown in the lower drawing of FIG. 4. The wings 20 are also configured to be able to rotate in the spread state such that the angle thereof is changed. Thus, for example, the lift can be adjusted by changing the angle of the plate surfaces of the wings 20 consisting of approximately plate-shaped members in the spread state as shown by an arrow Y2 in the lower drawing of FIG. 4.

FIG. 5 shows an example of a specific configuration of a wing 20. The left drawing of FIG. 5 shows a state in which the wing 20 is closed, and the right drawing of FIG. 5 shows a state in which the wing 20 is spread. The wing 20 is formed by separating one end side and the other end side in the length direction of a plate-shaped member from each other and includes a one end-side first member 21 joined to the body 1 and a second member 22 joined to the first member 21. The first member 21 is rotatably joined to the body 1 through a first shaft 23 with the plate surface thereof opposed to the rear surface of the body 1. A second shaft 24 extending in the length direction of the wing 20 is joined to the other end-side end surface of the first member 21, and the one end-side end surface of the second member 22 is rotatably joined to the second shaft 24. According to the above configuration, when the first member 21 is rotated with respect to the body 1 around the first shaft 23 as shown by an arrow Y1 in a closed state shown in the left drawing of FIG. 5, the wing 20 become a spread state shown in the right drawing of FIG. 5. Also, when the second member 22 is rotated with respect to the first member 21 around the second shaft 24 as shown by an arrow Y2 in the spread state, the angle of the plate surface of the wing 20 is changed.

Figure 6:
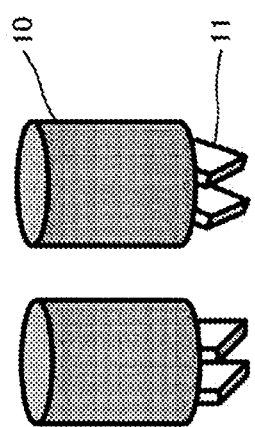
FIG. 6 is a drawing showing a modification of the configuration of the flying robot disclosed in FIG. 4.
Figure 6:
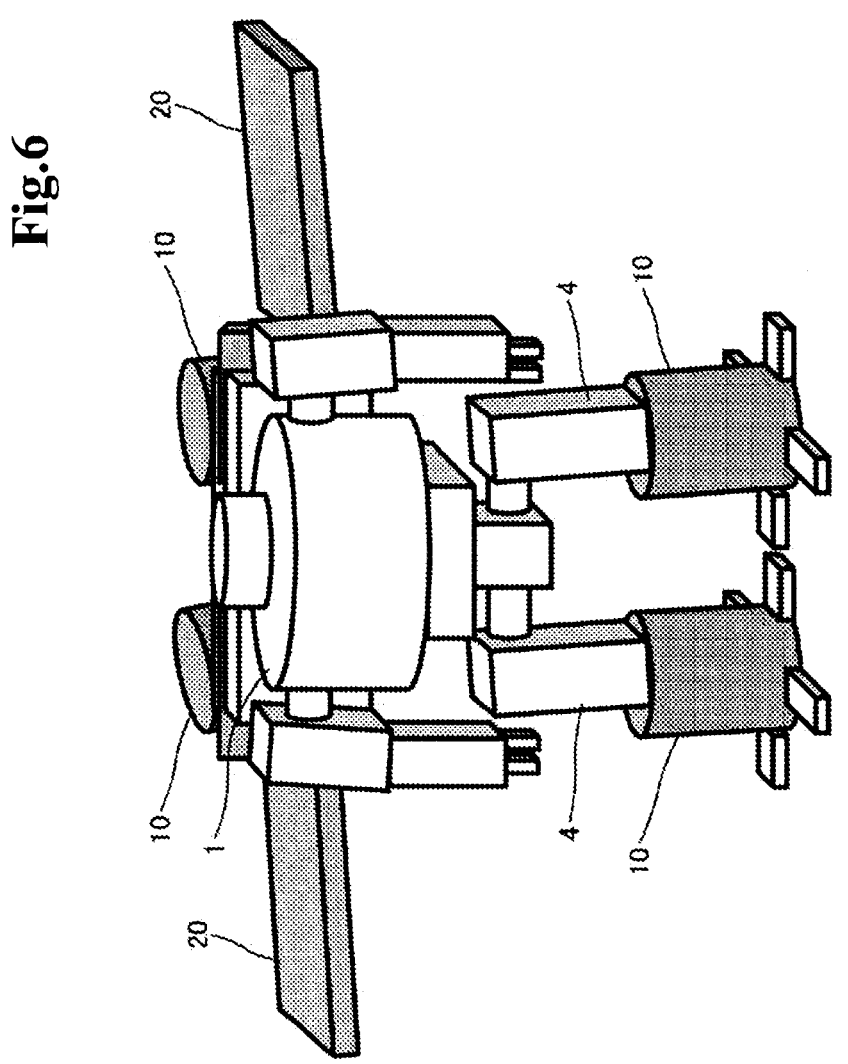

The flying robot also includes direction change mechanisms for changing the flight direction. For example, as shown in the left drawing of FIG. 6, the direction change mechanisms may be mechanisms for rotating the propulsion units 10 themselves so that the propulsion direction of the propulsion units 10 is changed. Or, as shown in the right drawing of FIG. 6, thrusters 11 for changing the propulsion direction by changing their orientation may be disposed on the propulsion units 10 as direction change mechanisms. For example, each thruster 11 consists of one or more plate-shaped members. Or the direction change mechanisms may be mechanisms for rotating the wings 20 so that the flight direction is changed, as shown in the left drawing of FIG. 6.

Third Example Embodiment

Next, a third example embodiment of the present invention will be described. In the present example embodiment, the configuration of the flying robots described in the above example embodiments will be outlined.

A flying robot according to the present example embodiment includes a body, an arm disposed on a lateral side of the body, a leg disposed under the body, and a propulsion unit disposed around the body. The arm is able to move at least to above the body, and the propulsion unit is disposed in an area different from an area in which the arm is able to move and to do predetermined work.

The present invention thus configured is able to improve the degree of freedom of work done by the arms of the flying robot.

While the present invention has been described with reference to the above example embodiments and so on, the present invention is not limited to the example embodiments. The configuration or details of the present invention can be changed in various manners that can be understood by one skilled in the art within the scope of the present invention.

SUPPLEMENTARY NOTES

Some or all of the above embodiments can be described as in Supplementary Notes below. While the configuration of the flying robot according to the present invention is outlined below, the present invention is not limited thereto.

Supplementary Note 1

A flying robot comprising:
a body;
an arm disposed on a lateral side of the body;
a leg disposed under the body; and
a propulsion unit disposed around the body,
wherein the arm is able to move at least to above the body, and
wherein the propulsion unit is disposed in an area different from an area in which the arm is able to move and to do predetermined work.

Supplementary Note 2

The flying robot of Supplementary Note 1,
wherein the arm is configured to be able to move at least to the front of and above the body, and
wherein the propulsion unit is disposed behind the body.

Supplementary Note 3

The flying robot of Supplementary Note 1 or 2,
wherein the arm is configured to be able to grasp an object, the flying robot further comprising a container disposed around the body and configured to be able to contain an object,
wherein the propulsion is disposed in an area different from an area of the container around the body.

Supplementary Note 4

The flying robot of Supplementary Note 3,
wherein the propulsion unit is disposed behind the body, and
wherein the container is disposed between a rear surface of the body and the propulsion unit.

Supplementary Note 5

The flying robot of any one of Supplementary Notes 1 to 4, further comprising another propulsion unit disposed on the leg.

Supplementary Note 6

The flying robot of any one of Supplementary Notes 1 to 5, further comprising a wing configured to be able to rotate so as to become a closed state and a spread state.

Supplementary Note 7

The flying robot of any one of Supplementary Notes 1 to 6, further comprising a direction change mechanism configured to change a flight direction.

Supplementary Note 8

The flying robot of any one of Supplementary Notes 1 to 7, wherein the body is configured to be able to contain a power source of the propulsion unit.

Supplementary Note 9

The flying robot of any one of Supplementary Notes 1 to 8, further comprising a protrusion joined to a periphery of a bottom of the leg and protruding outward, wherein the protrusion is configured such that a protruding end thereof can be displaced in an up-down direction using a junction of the protrusion and the leg as a support.

What is claimed is:

1. A flying robot comprising:

a body;

an arm disposed on a lateral side of the body;

a leg disposed under the body; and a propulsion unit disposed around the body, wherein the arm is able to move at least to above the body, wherein the propulsion unit is disposed in an area different from an area in which the arm is able to move and to do predetermined work;

wherein the arm is configured to be able to grasp an object, the flying robot further comprising a container disposed around the body and configured to be able to contain an object, wherein the propulsion unit is disposed in an area different from the area of the container around the body, wherein the propulsion unit is disposed behind the body, and wherein the container is disposed between a rear surface of the body and the propulsion unit.

2. The flying robot of claim 1, wherein the arm is configured to be able to move at least to a front of and above the body.

3. The flying robot of claim 1, further comprising another propulsion unit disposed on the leg.

4. The flying robot of claim 1, further comprising a wing configured to be able to rotate so as to become a closed state and a spread state.

5. The flying robot of claim 1, further comprising a direction change mechanism configured to change a flight direction.

6. The flying robot of claim 1, wherein the body is configured to be able to contain a power source of the propulsion unit.

7. The flying robot of claim 1, further comprising a protrusion joined to a periphery of a bottom of the leg and protruding outward, wherein the protrusion is configured such that a protruding end thereof configured to displaced in an up-down direction using a junction of the protrusion and the leg as a support.

* * * * *